May 5, 1964  P. L. BAILEY  3,131,956
REMOVABLE HUB INSERT
Filed May 31, 1960  2 Sheets-Sheet 1
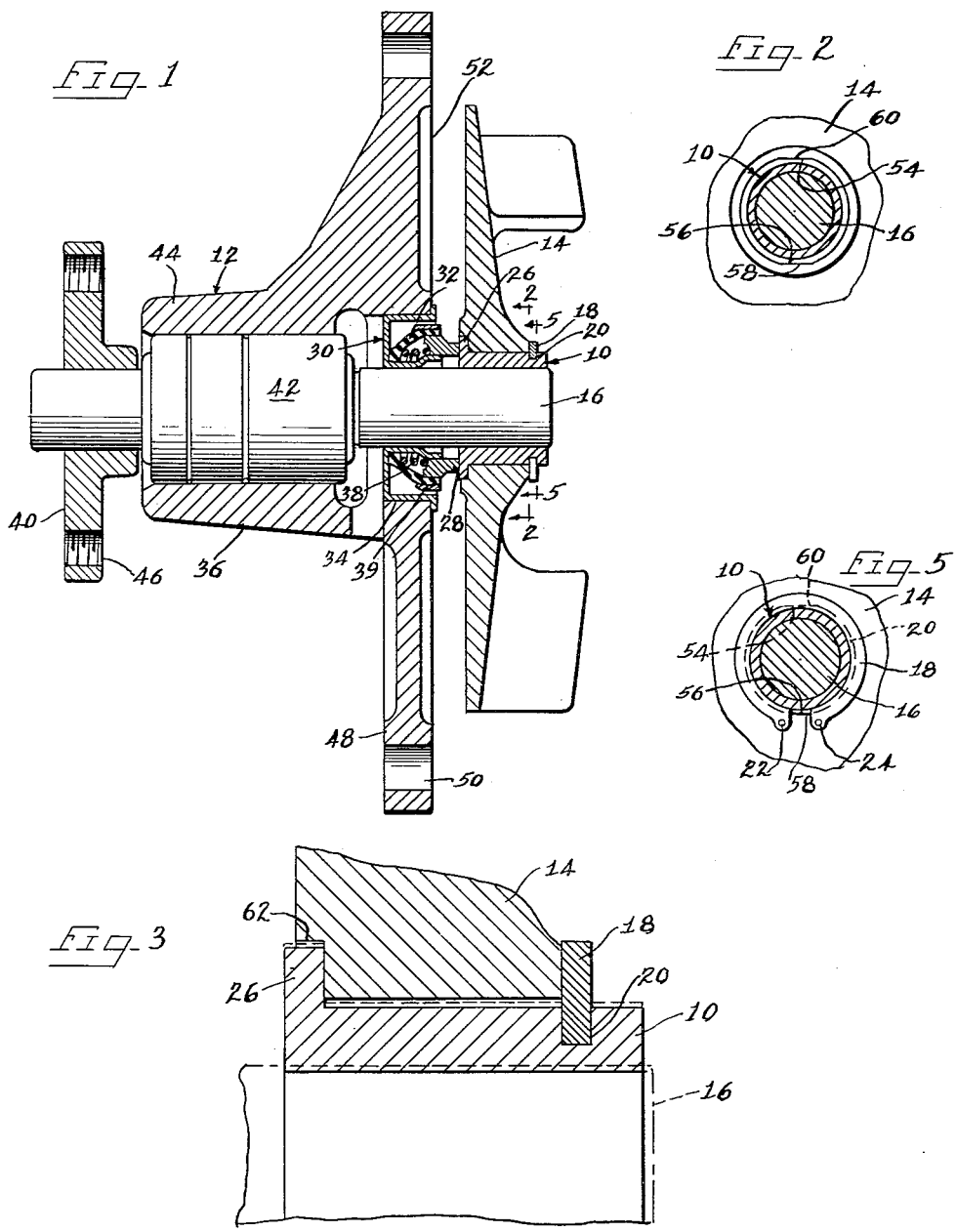
INVENTOR.
Phillip L. Bailey
BY
Hill, Sherman, Meroni, Gross & Simpson   Attys

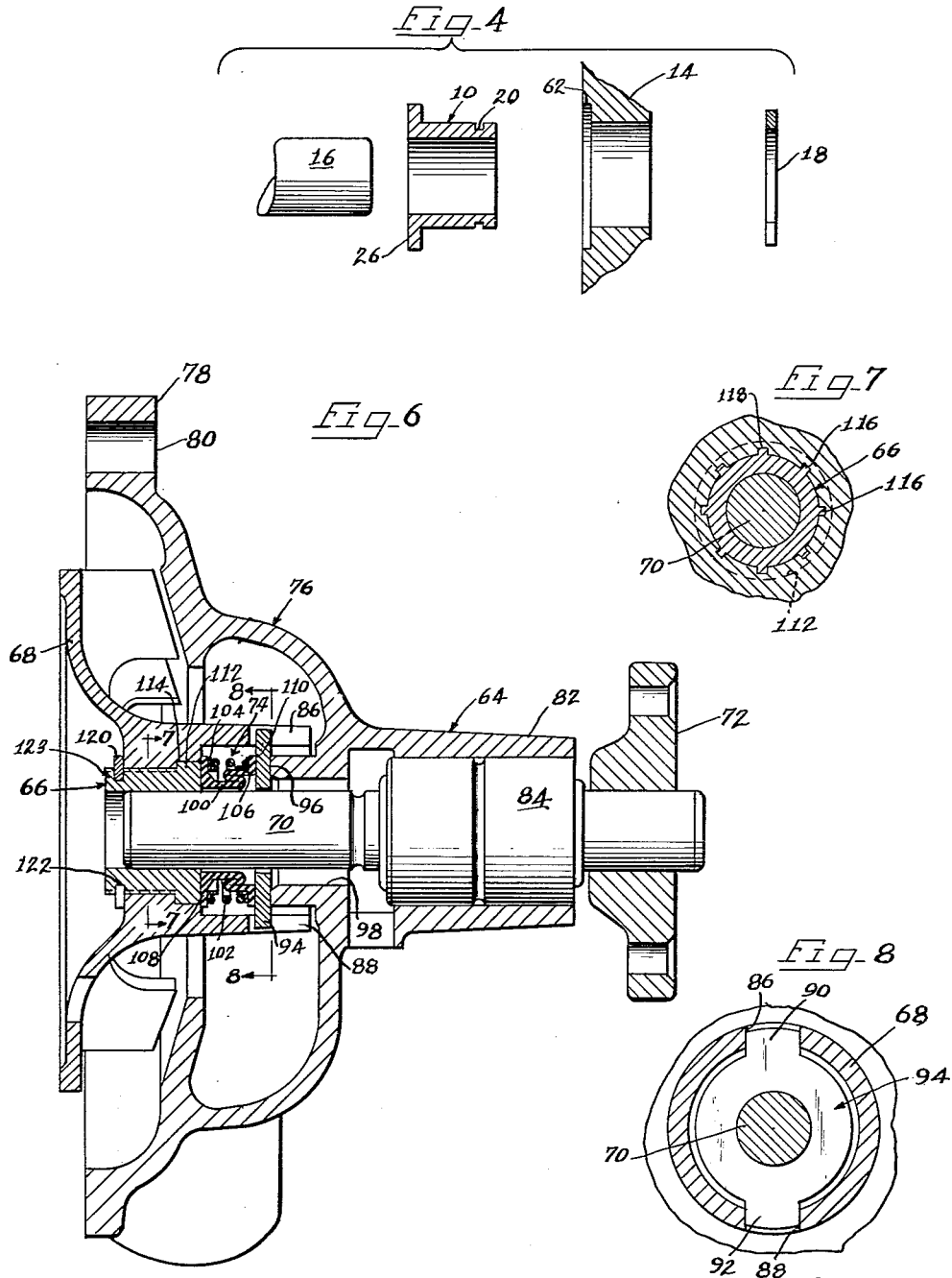

Patent 3,131,956

3,131,956
REMOVABLE HUB INSERT
Phillip L. Bailey, Wickliffe, Ohio, assignor to Thompson Ramo Wooldridge Inc., Cleveland, Ohio, a corporation of Ohio
Filed May 31, 1960, Ser. No. 32,744
5 Claims. (Cl. 287—52.07)

This invention relates to an insert for use with a component such as an impeller or the like which must be press fitted or otherwise secured to a mating part, and more particularly to an insert which may be removable and which eliminates the stress induced when an insert is molded or cast in the component.

Currently, many types of components are press fitted to a mating part, and when such components are made of low strength materials such as aluminum or plastic it is often necessary to cast or mold an insert of higher strength material in the component to resist the stresses resulting from the press fit. In other instances, an insert of higher strength material is desirable even though a press fit is not employed, because of the type of load to be transmitted or because of the type of locking device that is to be used. However, molding a high strength insert of steel, cast iron or the like in a plastic part often results in premature failure resulting from the internal stresses induced when the plastic or aluminum shrinks around the insert upon hardening. The loads produced from a press fit, or from normal service, combine with these residual stresses to increase the frequency of failure.

The present invention overcomes these problems by means of a loose insert which is removably positioned in and secured to the primary component by means of a bolt, snap ring or other fastening device after the component has been cast or molded. The insert may be used for connecting a rotating component such as a pump impeller or cooling fan to a driving shaft by means of a press fit joint, or by other types of joints, and also has application to situations where a reciprocating component or other component is to be attached to its mating part by a press fit joint, or other joint. Accordingly, the residual stresses normally encountered when a metal insert is molded or cast in place are eliminated, and where a press fit joint is utilized, the resultant stresses are prevented from being transmitted to the cast or molded part because the peripheral dimensions of the insert may be made slightly smaller than the corresponding dimensions in the said cast or molded part. For example, when the insert is pressed on a shaft, its outer radial dimensions may increase by an amount approximately equal to 80% of the interference fit. However, the clearance afforded by the invention will prevent expansion stresses from being transmitted to the molded or cast component.

Accordingly, it is an object of the present invention to provide an insert which can be removably connected to a molded or cast component such as a pump impeller or a cooling fan, whereby inserts with various design details and variations can be utilized with the same type of component, and whereby components with variations in design details can be used with the same type of insert.

Another object of the invention is to provide an insert which can be installed at a point in the sequence of assembly operations such that the more fragile molded or cast part is less likely to break than is the case where the insert must be molded or cast in the component.

Another object of the invention is to provide a molded or cast component which can be readily replaced if damaged in shipment, installation or in normal service, as a result of the readily removable feature of the insert.

Another object of the invention is to provide an insert construction which materially reduces the cost of molding or casting in many instances, because the mold or press cycle time is reduced in that the insert need not be handled during the molding or casting process. The savings thus afforded more than offset the nominal cost of installing the insert at final assembly.

Another object of the invention is to provide an insert which eliminates the residual stresses previously encountered when a molded or cast part was also molded or cast to the insert.

Another object of the invention is to eliminate the transmission of stresses from an insert press fitted to a mating part, to the component to be secured to the part. Thus, expansion on the outer diameter of the insert resulting from such a press fit may be accommodated by appropriate calibration of the insert and the component to afford a clearance. With previously available constructions, such expansion represented a force or stress tending to cause failure in the component.

Another object of the invention is to provide an insert as described which may be utilized to connect a molded or cast component to a mating part, with either a press fit connection between the insert and the mating part or other types of connection such as a splined or keyed connection, a threaded connection or the like, so that a variety of applications for the insert may be utilized, as for example, use of the insert with rotating components, reciprocating components or other devices where a relatively fragile part must be strengthened at the point of its connection to another part, or where a higher strength is otherwise desirable as afforded by the insert.

Other objects and advantages of the invention will become apparent as the description proceeds in accordance with the drawings in which:

FIGURE 1 is a vertical sectional view of an insert according to the invention in combination with a water pump assembly, and a seal therein in rotatably sealing engagement with a flange on the insert;

FIGURE 2 is a vertical sectional view taken along the line 2—2 of FIGURE 1;

FIGURE 3 is an enlarged fragmentary vertical sectional view of an insert according to the invention showing the accommodation of stresses resulting from a press fit afforded by the said insert;

FIGURE 4 is an exploded view, partly in vertical section and broken away, of an insert assembly such as is shown in FIGURE 3;

FIGURE 5 is a vertical sectional view taken along the line 5—5 of FIGURE 1;

FIGURE 6 is a vertical sectional view of an insert according to the invention in combination with a pump assembly with the insert and a seal means for the pump assembly being mounted for co-rotation;

FIGURE 7 is a vertical sectional view taken along the line 7—7 of FIGURE 6 and showing a splined or ribbed construction for the embodiment of the insert of FIGURE 6; and FIGURE 8 is a vertical sectional view taken along the line 8—8 to illustrate the seal means of FIGURE 6.

Referring now to the drawings, and to FIGURES 1 through 5 in particular, an insert 10 is shown according to the present invention in combination with a water pump assembly 12 including an impeller 14 which may be formed of a relatively low strength material such as plastic or aluminum, and is connected to a driving shaft 16 by the said insert 10. Thus the component 14 is reinforced by the insert 10 at the location where torsional and other stresses are greatest, and the invention eliminates residual stresses between the insert 10 and the component 14 since the insert is not cast or molded to the said component 14, but is loosely secured thereto by means of a snap ring or bolt ring 18 or the like, as best seen in FIGURE 5. The insert 10 thus defines an annular groove 20 for receiving the insert holding ring 18, and the ring may, for example, be of a well known type having end apertures 22 and 24 to receive a tool to move the said ends toward one another as shown. The insert may also include an end flange 26 which, in the embodiment shown, affords a sealing face for rotational sealing engagement with a sealing boot 28 forming a part of a seal assembly 30. The sealing assembly 30 includes a rubber sleeve 32 positioned in a cross sectionally cup shaped receptacle 34 which may be coated with a material such as "permatex" before being pressed into the housing 36 of the pump assembly. A spring 38 bears against an inner end of the sleeve or gasket structure 32 and against an inner end of the sealing boot 28 to press the said sealing boot into the said sealing engagement with the flange 26 of the insert 10. An annular retainer 39 may be mounted on the sleeve 32 to hold the several parts in aligned relationship as shown.

The pump assembly 12 may also include a fan hub 40 secured to the shaft 16, the shaft 16 having a bearing portion 42 within a hub portion 44 of the housing 36. The hub portion 40 is provided with threaded apertures 46 for connection with a fan, as understood by those skilled in the art, and likewise, the housing 36 has a fastening plate 48 integrally formed therewith which defines apertures 50 for connection to the engine block or the like, the gasket 52 being disposed between the plate 48 and the supporting block or the like also as understood by those skilled in the art.

As also seen in FIGURE 5, the insert 10 has a tubular or sleeve-like configuration and may be provided with flats 54 and 56 having a mating complementary relationship to inner diameter flats 58 and 60 formed in the opening of the hub of the impeller 14, and it will be understood that other types of connection for affording co-rotation, such as splines or the like, may also be utilized in this embodiment of the invention.

However, a particular feature of the invention is that where the insert 10 is press fitted to the shaft 16, there need be no transmission of the resultant stresses to the relatively weaker component such as the impeller 14, although other methods of joining these elements such as threading, splining or the like, may also be used to meet particular conditions.

In FIGURE 3, the shaft 16 is press fitted into the insert 10, preferably after the insert has been positioned within the component 14 by means of the ring 18 and the flange 26 which is received in the recess 62. Thus the peripheral dimensions of the insert 10 are made slightly smaller than the corresponding dimensions in the cast or molded part 14, so that when the insert is pressed on the shaft 16 its outer radial dimensions will increase by an amount which may be, for example, 80% of the interference fit. The clearance provided by the relatively smaller peripheral dimension of the insert will thus permit the insert to move radially outwardly to the dotted line position, with the shaft in the dotted line position, so that no forcing or stressing of the component 14 is produced by the press fit connection between the insert and the shaft 16.

Referring now to FIGURES 6 through 8, another embodiment of the invention is shown wherein a water pump 64 is provided with an insert 66 according to the invention for maintaining the impeller component 68 in mating relationship to a shaft 70 to be driven by the impeller as previously indicated, a hub for a fan or the like 72 being mounted at the outer end of the shaft. In this embodiment, the insert 66 does not provide the main sealing surface since the sealing assembly 74 rotates therewith as hereinafter described. The pump assembly 64 thus includes a housing 76, having a fastening flange 78 forming apertures 80 to engage the assembly to a suitable support such as an engine block or the like as described. A hub portion 82 is provided in which is journaled a bearing structure 84 for the shaft 70, also as previously described. The impeller 68 defines a pair of axially extending slots 86 and 88 to receive radially extending ears or lugs 90 and 92 of a seal washer 94 as shown more particularly in FIGURE 8. Thus the seal washer is mounted to rotate with the impeller 68 and is urged by the seal assembly 74 against an annular seal face 96 formed integrally with the housing 76. Thereby leakage through the shaft opening 98 in the housing is prevented. The seal assembly 74 may include a folded sleeve or bellows member 100 of rubber material or the like, and a spring 102 positioned in angle rings 104 and 106 to bear against end flats 108 and 110 in abutting engagement with the insert 66 and the seal washer 94 respectively. The insert 66 has a shoulder 112 received in a mating recess 114 in the impeller hub and it will thus be appreciated that a seal surface such as afforded by the flange 26 in the embodiment of FIGURES 1 through 5 does not form a necessary part of the insert of the invention. The insert is further provided with a series of angularly disposed axially extending ribs 116 slidably received in mating recesses 118 in the hub of the impeller. A ring 120 is similarly received in a groove 122 to afford selective insertion and removal of the insert relative to the impeller, so that the impeller may be disassembled with respect to the shaft 70 as desired, and parts may be replaced without difficulty as hereinabove indicated. In this embodiment also, the insert 66 may be press fitted to the shaft 70 and the interference fit will be such that the insert may expand as a result of the press fit without creating undesirable stresses in the impeller. The ribbed constructions 116, however, afford a secure mounting of the impeller on the insert in that they resist torsional stresses and the like, although it will be appreciated that other types of configurations such as flats, splines or the like could be utilized in substitution for the ribs 116.

In each of the embodiments, and in other applications which may utilize a reciprocating member connected by an insert according to the invention to a shaft or the like, means for connecting the insert to the component of weaker material may be used other than a snap ring and groove, such means for example including a Tinnerman fastener, speed nut means, or the like. Other variations in the construction of the insert may also be accommodated within the scope of the invention, as for example, the outer flange portion of the insert adjacent the rings may be reduced if desired. The resultant stepped configuration may facilitate insertion and removal of a snap ring, although it will be appreciated that such variations are not requisite to the effective operation of the device. Also, the insert may be formed of different materials, though preferably being of a relatively high strength material such as iron or the like in the instances where a connection is provided for an outer component molded of lower strength material such as plastic or aluminum.

Accordingly, there has been provided an insert which may be positioned in an outer component subsequent to formation of the outer component by casting, molding or the like so that internal stresses such as previously induced when the molded plastic, aluminum or the like shrunk around the insert upon solidification have been eliminated. Furthermore, the expansion forces resulting from a press fit between an insert and an inner component no longer damages the outer component since a clearance is provided between the insert and the outer component. And the insert may be utilized with a variety of force-transmitting members or other structures whether rotatable or reciprocable to afford selective disengagement of one component thereof with respect to another.

As a result, the common molded or cast part can accommodate inserts with a variety of design details to satisfy different applications. Furthermore, the insert may be installed in a desirable point in the sequence of the assembly operations, and the more fragile molded or cast part may also be installed at a time and place where breakage is less likely. Further, the molded or cast part may be conveniently replaced if damaged in shipment, installation or in normal service, as a result of the relative movement between the insert and the cast part afforded by the invention.

Manufacturing economies are afforded in that the mold or press cycle time is reduced because it is no longer necessary to handle the insert during this phase of molding or casting. This reduction in time more than offsets the cost of installation of the insert at final assembly.

The entire device is exceptionally simple and easy to assemble and disassemble, therefore, and has application in a wide variety of situations other than those illustrated.

Although I have herein set forth and described my invention with respect to certain specific details and principles thereof, it will be obvious to those skilled in the art that these may be varied without departing from the spirit and scope of the invention as set forth in the hereunto appended claims.

I claim as my invention:

1. An insert for connecting an outer component of a force transmitting member to an inner component comprising:
   a sleeve having a free state outer diameter sized to fit loosely within the outer component and having a free state inner diameter sized for press fitting on the inner component,
   an enlarged portion at one end of said sleeve for abutting engagement with the outer component to resist axial movement of the insert in one direction,
   a circumferential groove in the other end of the sleeve,
   a ring-like element removably mounted in said groove and extending above the groove for abutting engagement with said outer component to resist axial movement of the insert in the other direction,
   and said sleeve being expanded from its free state diameters by said inner component into tight engagement with said outer component without substantial stressing of the outer component.

2. In combination with an outer component having a bore and an inner component in said bore for driving said outer component,
   a sleeve between said inner and outer components having a free state outer diameter smaller than said bore and a free state inner diameter for press fit engagement with said inner component,
   said sleeve being expanded by said inner component into snug engagement in said bore,
   means securing said sleeve against axial movement relative to said outer component,
   and means securing said sleeve against circumferential movement relative to said outer component.

3. A torque-transmitting member having an outer component forming an opening therethrough, a sleeve-like insert removably received in said opening in complementary relationship thereto, mating surfaces on said insert and said outer component in the opening thereof for maintaining said insert and said outer component against relative angular movement while affording axial movement, means releasably retaining said insert in said outer component, said insert having an initial clearance with respect to said outer component, and an inner component press-fitted into said insert to take up a major portion of said clearance without effecting radial stress between said insert and said outer component.

4. In a pump assembly including an impeller having a hub with an opening therethrough,
   a shaft extending into said opening and a shaft seal surrounding the shaft and biased toward said impeller,
   the improvement of a sleeve in said opening on said shaft,
   said sleeve having an inner diameter smaller than said shaft diameter and an outer diameter smaller than the diameter of said impeller opening,
   said shaft expanding said sleeve into snug engagement with said impeller,
   a flange on one end of said sleeve in thrust engagement with said impeller receiving the spring biased seal thereagainst in sealing engagement therewith,
   said sleeve having a circumferential groove around the end thereof remote from said flange,
   a snap ring in said groove in thrust engagement with said impeller to cooperate with the flange for holding the impeller and sleeve against axial movement,
   and key means securing said sleeve and impeller against relative angular movement.

5. In a pump assembly including a housing,
   a shaft journalled in said housing,
   an impeller having a large diameter,
   a bore surrounding said shaft,
   and a shaft seal between said housing and impeller including a spring biased seal ring adjacent said impeller,
   the improvement of a sleeve press-fitted on said shaft and expanded by said press-fit into snug engagement with the large diameter bore of said impeller,
   said sleeve having a free state inner diameter smaller than the diameter of said shaft and a free state outer diameter smaller than the diameter of said bore,
   and said press-fit expanding said sleeve into snug relatively non-stressing engagement with said impeller,
   the end of said sleeve adjacent said seal ring having an out-turned flange in sealing engagement with the seal ring and thrusting against said impeller,
   the opposite end of said sleeve having a circumferential groove adjacent the opposite end of the impeller,
   a snap ring in said groove engaging said impeller and cooperating with said flange to hold the impeller against axial movement on the sleeve, and means drivingly connecting said sleeve and impeller whereby said shaft is press-fitted into said impeller without transmitting stresses to the impeller.

References Cited in the file of this patent

UNITED STATES PATENTS

| | | |
|---|---|---|
| 1,771,349 | Puffer | July 22, 1930 |
| 2,443,688 | McFarland | June 22, 1948 |
| 2,456,516 | Kidney | Dec. 14, 1948 |
| 2,938,661 | Ricketts | May 31, 1960 |